United States Patent [19]

Yao

[11] Patent Number: 5,672,878
[45] Date of Patent: Sep. 30, 1997

[54] IONIZATION CHAMBER HAVING OFF-PASSAGEWAY MEASURING ELECTRODES

[75] Inventor: Jonathan Yi Yao, Pleasant Hill, Calif.

[73] Assignee: Siemens Medical Systems Inc., Iselin, N.J.

[21] Appl. No.: 740,084

[22] Filed: Oct. 24, 1996

[51] Int. Cl.⁶ ............................................. G01T 1/185
[52] U.S. Cl. .................................................. 250/385.1
[58] Field of Search ....................................... 250/385.1

[56] References Cited

U.S. PATENT DOCUMENTS

| | | | |
|---|---|---|---|
| 3,838,284 | 9/1974 | McIntyre et al. | 250/385.1 |
| 3,852,610 | 12/1974 | McIntyre | 250/385.1 |
| 3,942,012 | 3/1976 | Boux | 250/385.1 |
| 4,131,799 | 12/1978 | Stieber | 250/385.1 |
| 4,206,355 | 6/1980 | Boux | 250/385.1 |
| 4,427,890 | 1/1984 | Taumann | 250/385.1 |
| 4,627,089 | 12/1986 | Menor et al. | 378/157 |
| 4,751,393 | 6/1988 | Corey, Jr. et al. | 250/492.21 |
| 5,072,123 | 12/1991 | Johnsen | 250/385.1 |
| 5,326,976 | 7/1994 | Kikuchi | 250/385.1 |

*Primary Examiner*—Carolyn E. Fields

[57] ABSTRACT

An ionization chamber for monitoring a radiation beam includes a housing having a primary beam passageway and a number of secondary beam cells that are adjacent to the primary beam passageway. The primary beam passageway passes entirely through the housing. In the preferred embodiment, a large-area beam measuring electrode and an array of small-area beam measuring electrodes are each coaxial with the primary beam passageway. Also, in the preferred embodiment, each secondary beam cell includes a beam measuring electrode. Because the portions of the radiation beam that enter the secondary beam cells do not pass through the ionization chamber, these portions do not contaminate the treatment beam, allowing the beam measuring electrodes within the cells to be dimensioned and configured so as to maximize signal strength.

19 Claims, 3 Drawing Sheets

IONIZATION CHAMBER HAVING OFF-PASSAGEWAY MEASURING ELECTRODES

BACKGROUND OF THE INVENTION

The invention relates generally to monitoring a radiation beam, and more particularly to an ionization chamber for monitoring beam characteristics of radiation emitted from a linear accelerator.

DESCRIPTION OF THE RELATED ART

Systems for emitting a high-energy radiation beam are known and are used in such applications as providing radiation therapy. For example, a linear accelerator emits a radiation cone that may be an electron beam or a photon (x-ray) beam. When used to provide radiation therapy, the emitted beam is then configured to substantially match the shape of diseased tissue, with a goal of minimizing any adverse effect upon adjacent healthy tissue. The linear accelerator may be located in a gantry that rotates relative to a movable table on which a patient is supported.

In radiation therapy, an emitted cone of radiation should have a uniform dose rate and intensity across the entire cross section of the cone. Flattening filters within a primary collimator are sometimes used to achieve this uniformity. Nevertheless, it is common to use an ionization chamber to analyze the homogeneity of the beam, whether the beam is conical or cylindrical. U.S. Pat. No. 4,627,089 to Menor et al., which is assigned to the assignee of the present invention, describes a linear accelerator system having a flattening filter and a dose chamber for monitoring the characteristics of the radiation cone. In many applications, the system includes two ionization chambers, with the first chamber used when an electron beam is monitored and with the second chamber moved into the position of the first when the system is used to apply an x-ray beam. Typically, the ionization chamber or chambers will be connected to corrective circuitry for providing beam adjustment, if needed.

U.S. Pat. No. 4,131,799 to Stieber describes an ionization chamber for analyzing inhomogeneities in a radiating beam from a particle accelerator system. The ionization chamber includes two measuring chambers formed by three mutually parallel walls that are spaced apart by spacer rings. Two of the three parallel walls have single electrodes formed on the wall surfaces, while a third wall has several mutually isolated electrodes that include a central circular electrode and a group of electrode segments arranged in circular fashion around the central electrode. Inhomogeneities in the radiation intensity of a beam are detected by comparing currents in the central electrode relative to the surrounding electrode segments or in the electrode segments themselves relative to each other.

U.S. Pat. No. 5,326,967 to Kikuchi describes an ionization chamber that forms an ionization space using a frame made of insulating material. A high-voltage electrode and a collecting electrode are positioned on opposite sides of the ionization space to cause an ionization current when a radiation beam is projected through the frame. The ionization space has an equal dimension throughout the passage of the radiation, so that Boyle-Charles' Law applies to the ionization space. The ionization chamber is airtight. Sealed ionization chambers are common in the art.

Other ionization chambers and circuitry for providing beam correction are described in U.S. Pat. Nos. 5,072,123 to Johnsen, 4,751,393 to Corey, Jr. et al., 4,206,355 to Boux, and 3,852,610 to McIntyre. While the other three patents are for use in radiotherapy systems, Corey, Jr. et al. describes a system for ion implantation, such as used in semiconductor wafer fabrication, in which the radiation beam is continuously scanned. In this scanning implementation, beam-sensing apertures are positioned adjacent to the aperture for passage of the scanning ion beam to the target plane. While there are a number of beam-sensing apertures, a single beam current signal is generated, with a demultiplexing scheme then being used to separate the individual signals of the beam-sensing apertures. The demultiplexing scheme utilizes the scanning signal to identify the individual beam-current components of the single signal. Many of the features of Corey, Jr. et al. are not applicable to the fixed-beam implementations of the above-cited patents.

In addition to monitoring beam homogeneities, ionization chambers monitor beam position and direction. Proper patient treatment requires precise application of the radiation beam to diseased tissue. Comparison of the signals from different electrodes contained within an ionization chamber allows the system to determine beam position and directionality.

While the prior art ionization chambers and beam-monitoring systems operate well for their intended purposes, the ionization chambers are often cost ineffective. For example, if separate ionization chambers are needed for monitoring an electron beam and an x-ray beam, there must be a duplication of parts. Moreover, the ionization chambers are often sealed, so that the airtight chambers are less susceptible to the influence of variations in air pressure and/or temperature. Providing an airtight seal increases the cost of manufacture.

What is needed is an ionization chamber that monitors radiation beam characteristics and position in a reliable and cost-effective manner, with a single ionization chamber being suitable for monitoring both electron and photon beam energy.

SUMMARY OF THE INVENTION

An ionization chamber for monitoring a radiation beam includes a housing having a primary beam passageway and having an array of secondary beam cells adjacent to the primary beam passageway. A first array of beam measuring electrodes is contained within the housing and located along the primary beam passageway. These first beam measuring electrodes have outputs that are responsive to detection of energy of that portion of a radiation beam that is directed through the primary beam passageway. Second beam measuring electrodes are located within the secondary beam cells and have outputs responsive to energy of a second portion of the radiation beam. In the preferred embodiment, there is also a large-area beam measuring electrode that is positioned within the primary beam passageway and that has an area exceeding the sum of the areas of the first beam measuring electrodes. High voltage electrodes are disposed relative to the beam measuring electrodes to induce ionization current that is used to detect radiation characteristics, direction and position.

In another embodiment, the second beam measuring electrodes are arranged parallel to the large-area beam measuring electrode and are symmetrically arranged immediately about the axis of the primary beam passageway. This arrangement of the second beam measuring electrodes at the axis increases the sensitivity of the ionization chamber to beam tilt and misalignment. The ionization chamber can be used to measure either electron or photon radiation and, in one embodiment, is pervious to the surrounding atmosphere. Temperature sensors may be connected to an unsealed ionization chamber, so that processing circuitry can be used to offset changes in monitoring data with variations in temperature.

BEST MODE FOR CARRYING OUT THE INVENTION

Figure 1:
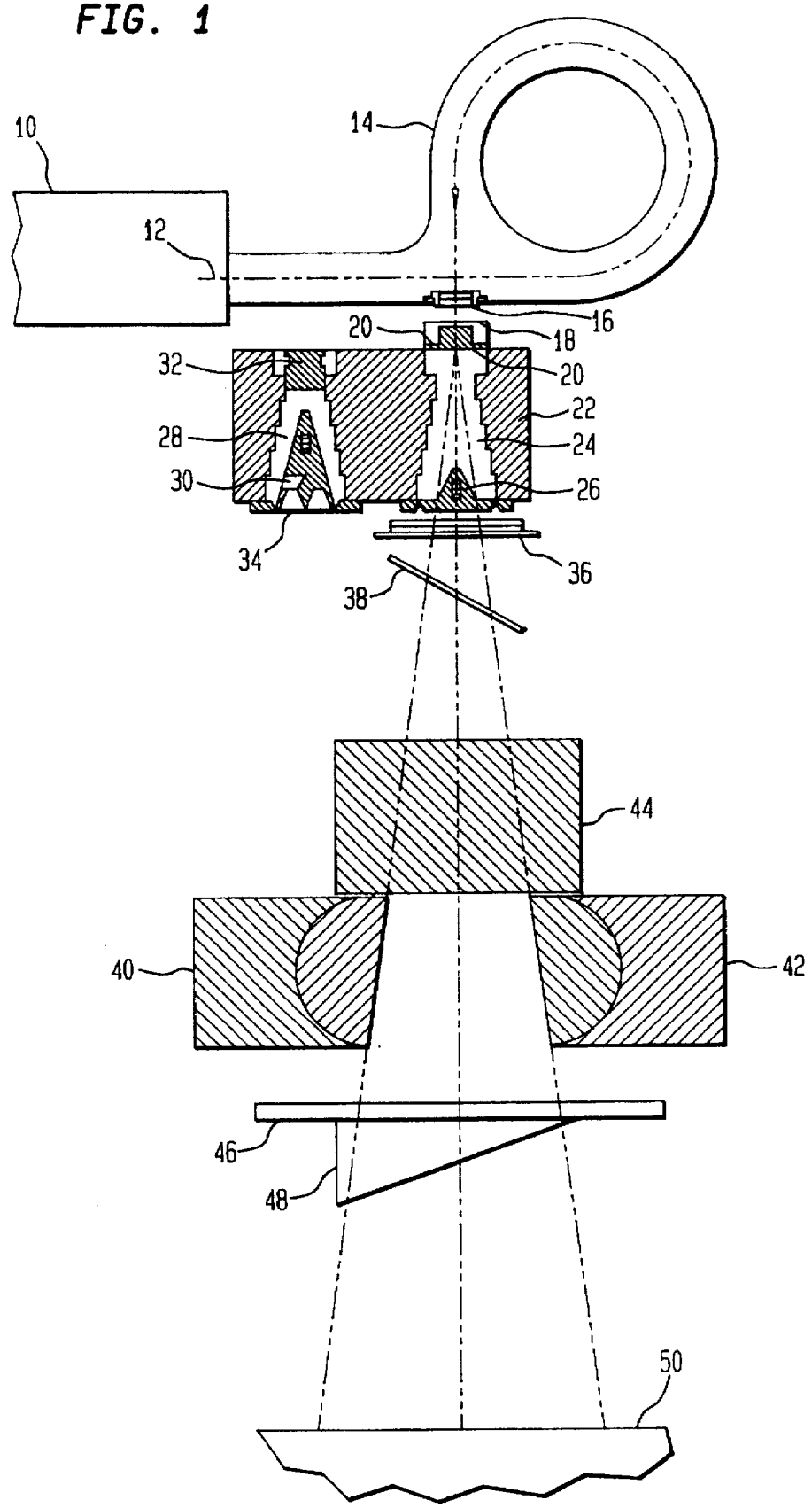
FIG. 1 is a side view of a radiation system having an ionization chamber in accordance with the invention.

With reference to FIG. 1, a radiation system for medical applications is shown as including a conventional linear accelerator 10 which generates an electron beam 12 that is accelerated using known energy-transfer techniques. A guide magnet 14 bends the electron beam by approximately 270°. The electron beam then exits through a window 16 that is transparent to the beam, but preserves the vacuum condition within the linear accelerator and guide magnet. The window may be formed of titanium, but this is not critical.

Photon radiation is produced by impinging the emitted electron beam with a target 18. Alternatively, a scattering foil may be utilized, if electron radiation is desired. Whether a target is used in order to provide photon radiation or a scattering foil is used, a conical beam is formed.

The exemplary radiation system of FIG. 1 is shown as including a beamstopper 20. Beamstoppers are known in the art, but are not critical to the invention. The conical radiation beam enters a primary collimator 22 having a stepped interior 24. The primary collimator provides an initial limitation on the expansion of the conical radiation beam.

Within the stepped interior 24 of the primary collimator is a stainless steel flattening filter 26. A flattening filter "flattens" the energy spectrum of a conical x-ray beam. The flattening filter has a conical design that is contoured to achieve desired beam characteristics, e.g., beam homogeneity. The flattening filter 26 is a low energy type, e.g., 6 MV. When the radiation system is in a higher energy mode, e.g. 10 MV, the primary collimator 22 is shifted so that a second stepped interior 28 is aligned with the exit window 16 of the guide magnet 14. Within the second stepped interior is a higher energy flattening filter 30. A 10 MV absorber 32 is at the entrance of the second stepped interior 28, while a compensator 34 is located at the exit. The functions of the absorber and the compensator are well known in the art.

An ionization chamber 36 is utilized to monitor beam characteristics, alignment and directionality. The structure and operation of the ionization chamber will be described fully below.

A mirror 38 is employed in the setup procedure of the radiation system. Prior to application of the radiation beam onto a patient, a light source is directed at the mirror to project a light field onto the patient. If the light field does not match the desired radiation field, beam-defining structure is manipulated until a light field-to-radiation field coincidence is achieved. In FIG. 1, the field-defining structure is a secondary collimator having Y-axis jaws and X-axis jaws. The X-axis jaws are shown as including two blocks 40 and 42 formed of radiation attenuating material. Likewise, the Y-axis jaws include two blocks, but only one of the blocks 44 is visible in FIG. 1. The blocks are movable relative to each other, allowing a beam passing through the secondary collimator to be trimmed and shaped. More intricate beam configurations are possible using multi leaf collimators.

Also shown in FIG. 1 are a wedge tray 46 and a wedge filter 48. A wedge filter is a tapered block of radiation material that is used to provide a progressive decrease in the dose rate across a portion or all of a treatment region of a patient 50.

Figure 2:
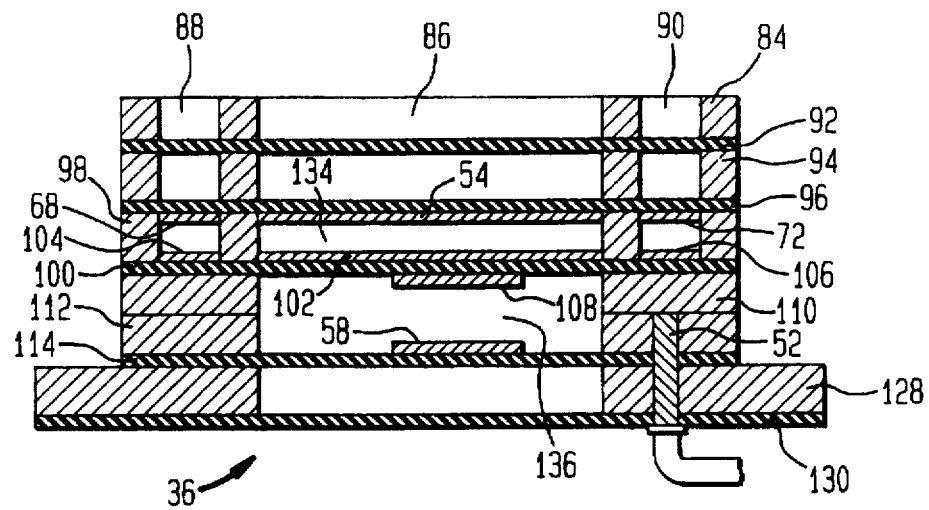
FIG. 2 is a side sectional view of the ionization chamber of FIG. 1.

With the exception of the ionization chamber 36, none of the structure of FIG. 1 is critical to the invention. A side sectional view of the ionization chamber is shown in FIG. 2. The ionization chamber is used to monitor either an electron radiation beam or a photon radiation beam. That is, rather than having separate ionization chambers for the two forms of energy, a single chamber operates in both capacities. This reduces the manufacturing cost of the overall radiation system.

The ionization chamber is pervious to the surrounding atmosphere. Consequently, less expensive materials and manufacturing processes may be used in forming the ionization chamber, relative to conventional sealed chambers. In order to compensate for any changes in the temperature during beam monitoring, a temperature sensor 52 is included. The temperature sensor may be a thermistor that is connected to data processing circuitry. If the temperature of the ionization chamber 36 varies, the sensor will detect the variation. The processing circuitry may have stored memory (e.g., a look-up table) of the effect of beam measurements with changes in temperature. This allows the processing circuitry to offset such effects. In the preferred embodiment, there are multiple temperature sensors.

Figure 3:
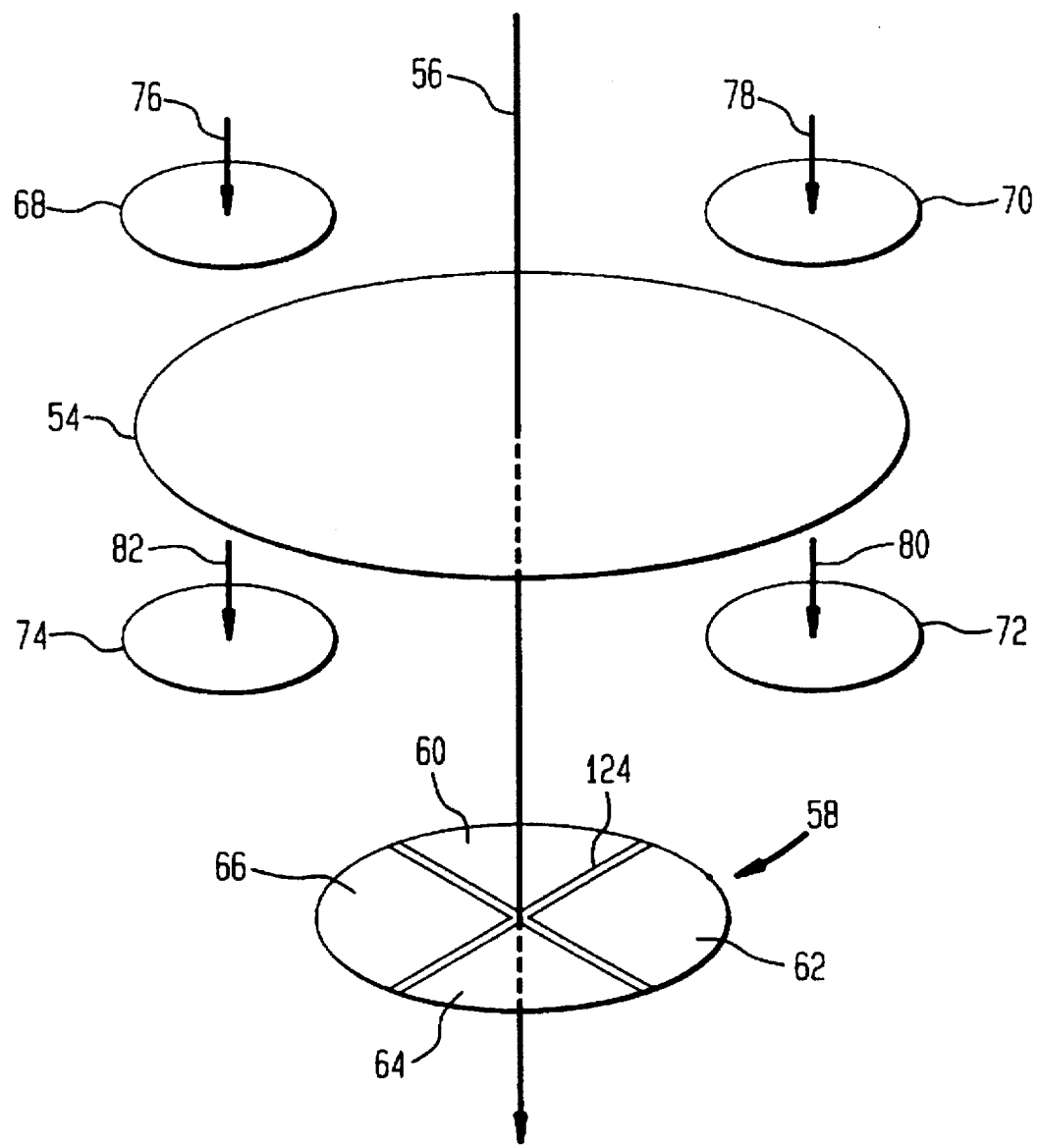
FIG. 3 is a conceptual view of the arrangement and operation of beam measuring electrodes of FIG. 2.

The most significant difference between the ionization chamber 36 of FIG. 2 and conventional ionization chambers for radiation beam monitoring relates to the arrangement of beam measuring electrodes. This arrangement is shown conceptually in FIG. 3. A total of nine beam measuring electrodes is utilized, but this number is not critical to the invention. The electrodes include a large-area beam measuring electrode 54 that is coaxial with the radiation beam when the radiation beam is properly aligned. The beam axis 56 is shown in FIG. 3. In addition to the large-area electrode 54, an array 58 of small-area beam measuring electrodes 60, 62, 64 and 66 is coaxial with the radiation beam. In the preferred embodiment, the small-area electrodes are electrically isolated segments of a patterned conductive layer, with each segment being immediately adjacent to the axis defined by the large-area electrode 54.

In addition to the on-axis beam measuring electrodes 54, 60, 62, 64 and 66, there are four off-axis beam measuring electrodes 68, 70, 72 and 74. As will be explained more fully below, the off-axis electrodes are beyond the beam passageway through the ionization chamber 36 of FIG. 2. The off-axis electrodes are impinged by beam portions 76, 78, 80 and 82 that do not contribute to treatment of a patient, since the beam portions do not exit the ionization beam. As a result, the use of the off-axis electrodes does not contaminate the treatment beam. The size of the off-axis electrodes can, therefore, be larger than conventionally positioned beam measuring electrodes that are used for comparable purposes.

The electrode arrangement shown conceptually in FIG. 3 may be utilized in a variety of signal processing implementations. In the preferred embodiment, the large-area beam measuring electrode 54 is used in connection with the array 58 of small-area electrodes 60, 62, 64 and 66 to provide dual channel capability. Safety standards sometimes require redundant channels for the determination of whether a radiation beam is being propagated through the ionization chamber. The large-area beam measuring electrode 54 preferably has a diameter that is generally equal to the diameter of the primary beam passageway through the ionization chamber 36. Consequently, any effect of the electrode on the propagating radiation beam will be uniform. The array 58 of electrodes 60, 62, 64 and 66 has a total area that is substantially less than the area of the electrode 54. The dimensions of the array 58 are not accurately shown in FIG. 3. In the preferred embodiment, the array 58 has a total area only slightly greater than the area of one of the off-axis electrodes 68, 70, 72 and 74. The small array provides the required beam monitoring data with a minimal effect on the beam.

The axially located small-area electrodes 60, 62, 64 and 66 are well suited for detecting beam tilt and misalignment.

The proximity of each of the electrodes of the array to the desired beam axis 56 increases the sensitivity of the array to variations in beam flatness and symmetry.

As previously noted, the off-axis beam measuring electrodes 68, 70, 72 and 74 are "off-passageway." That is, the electrodes are outside of the primary beam passageway through the ionization chamber 36. Since the size of the electrodes will not adversely affect the treatment beam, these electrodes may be substantially larger than conventionally located electrodes and will consequently provide a high signal-to-noise ratio (SNR) with regard to both in-plane and cross-plane information. Such information is particularly useful for purposes of beam steering.

In one embodiment, the diameter of the primary beam passageway through the ionization chamber 36 is 6.4 cm, and the diameter of the large-area beam electrode 54 is only slightly less than 6.4 cm in order to be isolated from the metallic rings to be described below. The diameter of the array 58 may be 2.05 cm, and the diameter of each of the off-axis beam measuring electrodes 68, 70, 72 and 74 may be 1.6 cm. However, these dimensions are not critical to the invention.

The ionization chamber 36 of FIG. 2 is formed of six rings, with five of the rings having a film adhered to the ring. Although not critical, the films are preferably formed of an insulative material sold by DuPont Company under the federally registered trademark KAPTON. A top cover ring 84 is an annular member that includes an axial opening that forms the first portion of the primary beam passageway 86 through the ionization chamber. In addition, the top cover ring includes four symmetrically arranged openings that form the first portions of four secondary beam cells 88 and 90, only two of which are shown in FIG. 2. The insulative film 92 that is adhered to the top cover ring 84 may have a thickness of 0.3 cm.

Immediately below the top cover ring 84 is a top ring 94 that structurally is substantially identical to the top cover ring. Thus, the four secondary beam cells 88 and 90 extend through the top ring. The film 96 that is adhered to the top ring may have a thickness of approximately 0.15 cm. A patterned layer of conductive material is formed on the underside of the film 96. For example, gold may be deposited to a thickness of 50 nm and/or electroplated to a thickness of 200 nm. Conventional etching techniques may then be used to remove portions of the gold layer from the surface of the KAPTON film 96. The resulting patterned film leaves the large-area beam measuring electrode 54 and the four off-axis beam measuring electrodes 68, 70, 72 and 74 of FIG. 3.

A middle ring 98 is the last ring through which the secondary beam cells 88 and 90 extend. A KAPTON film 100 of approximately 0.15 cm has a patterned middle layer on each of the opposed major sides. On the upper major side, an electroplated gold layer of approximately 200 nm thickness is patterned to provide an arrangement of high voltage electrodes 102, 104 and 106 that substantially matches the beam measuring electrodes on film 96. Only two of the high voltage electrodes 104 and 106 for the off-axis beam measuring electrodes 68, 70, 72 and 74 are shown in FIG. 2, but in the preferred embodiment there is a one-to-one correspondence of the off-axis high voltage electrodes and the off-axis beam measuring electrodes of FIG. 3. Electrical connections to the various electrodes can be achieved using any of known techniques. For example, the electrical connections may be from the bottom of the ionization chamber 36, such as shown with the temperature sensor 52. The central high voltage electrode 102 on the upper surface of the middle ring film 100 is operatively associated with the large-area beam measuring electrode 54. All of the high voltage electrodes may be connected to a source of 600 volts, but the voltage is not critical to the invention.

On the underside of the middle ring film 100 is a patterned high voltage electrode 108 that is formed of a patterned gold layer. An acceptable layer is an electroplated gold layer having a thickness of approximately 200 nm. While not critical, the high voltage electrode 108 may have a diameter that is approximately equal to the diameter of the array 58 of small-area electrodes 60, 62, 64 and 66.

Figure 4:
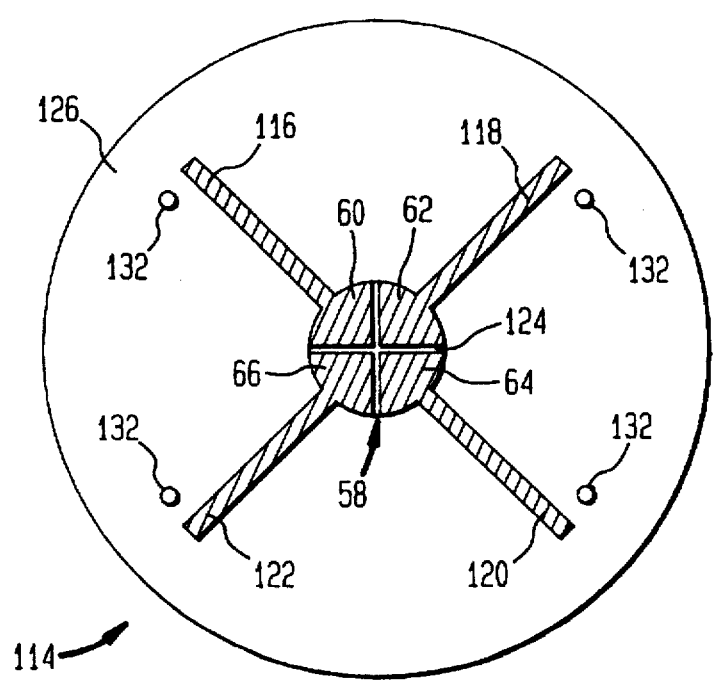
FIG. 4 is a top view of a lower ring film of FIG. 2, with a conductive layer that forms an array of beam measuring electrodes.

Below the middle ring 98 is an annular spacer 110. The spacer is the only ring component of the ionization chamber 36 that is not adhered to a film. In comparison, a lower ring 112 has an attached film 114 that supports the array 58 of small-area beam measuring electrodes directly below the high voltage electrode 108. A top view of the film 114 is shown in FIG. 4. A layer of electroplated gold is patterned to form the four small-area electrodes 60, 62, 64 and 66 and to form leads 116, 118, 120 and 122 for conducting signals from the electrodes to outside circuitry. The electrodes of the film are spaced apart by an insulative region 124. While not shown, the preferred embodiment includes metallization at the exterior region 126. This metallized exterior region is electrically grounded during operation. Therefore, the electrodes and leads must be isolated from the grounded exterior region.

At the bottom of the ionization chamber 36 of FIG. 2 are a lower cover ring 128 and a film 130. The thickness of the film may be 0.3 cm, but the thickness is not critical to the invention. The films 92 and 130 that are attached to the cover rings 84 and 128 are the only two films without metallization. Each of the rings 84, 94, 98, 110, 112 and 128 may be formed of aluminum. While not shown, fastening members pass through each of the rings in order to fix the assembly in position. Through holes 132 are shown in the film 114 of FIG. 4. The fastening members pass through the holes 132 and through aligned holes of the other components of FIG. 2.

In operation, the physics of beam measurement is well known in the art. When a radiation beam is propagated through the primary beam passageway 86 and simultaneously into the secondary beam cells 88 and 90, ions are produced in the gas within the ionization chamber 36. For example, between the large-area beam measuring electrode 54 and the high voltage electrode 102 is a measuring chamber in which ions will be produced. Because of the potential difference and polarity orientation between the high voltage electrode and the large-beam measuring electrode, an ionization current is generated. This current is directly proportional to the radiation intensity in the measuring chamber. The signal from the beam measuring electrode 54 will correspond to the ionization current. A second measuring chamber 136 is formed between the array 58 and the high voltage electrode 108. The second measuring chamber 136 is a segmented chamber, since the array comprises four beam measuring electrodes 60, 62, 64 and 66 as shown in FIGS. 3 and 4. As with the first measuring chamber 134, the signals from the beam measuring electrodes will be indicative of the ionization current generated as a result of the potential difference and polarity orientation of the individual electrodes relative to the high voltage electrode. However, for the segmented second measuring chamber 136, the individual signals from the electrodes may be used to monitor beam symmetry and homogeneity. In the ideal, the beam has a uniform intensity in its cross section and is coaxial with the ionization chamber 36. In this ideal situation, the signals from the four small-area beam measuring electrodes will be identical.

Measuring chambers are also formed within the secondary beam cells 88 and 90. The high voltage electrodes 104 and 106 within the secondary beam cells operate to provide the ionization current for generating beam measuring signals from the off-axis electrodes 68, 70, 72 and 74. As previously noted, these signals may be used in any of a number of implementations to acquire information regarding the radiation beam. Because the off-axis electrodes are preferably significantly larger than the individual beam measuring electrodes 60, 62, 64 and 66 of the array 58, the signals will tend to be strong. The off-axis electrodes may be particularly useful in acquiring in-plane and cross-plane information for use in properly steering the radiation beam.

While the invention has been described and illustrated as having four off-axis electrodes and four small-area beam measuring electrodes, this is not critical. The number may vary depending upon the application. In fact, in some embodiments it may be preferable to eliminate the secondary beam cells 88 and 90, while continuing to utilize the advantages of having the large-area beam measuring electrodes in conjunction with the array 58 of small-area beam measuring electrodes.

I claim:

1. An ionization chamber for monitoring a radiation beam comprising:
    a housing having a primary beam passageway through said housing and having a plurality of secondary beam cells adjacent to said primary beam passageway;
    a plurality of first beam measuring electrodes within said housing and located along said primary beam passageway, said first beam measuring electrodes having outputs responsive to energy of a first portion of said radiation beam directed through said primary beam passageway; and
    a plurality of second beam measuring electrodes located within said secondary beam cells, said second beam measuring electrodes having outputs responsive to energy of a second portion of said radiation beam.

2. The ionization chamber of claim 1 further comprising a plurality of high voltage electrodes parallel to said first and second beam measuring electrodes.

3. The ionization chamber of claim 1 wherein said plurality of first beam measurement electrodes includes segments of a layer of conductive material, said segments being symmetrically arranged immediately about an axis of said primary beam passageway through said housing.

4. The ionization chamber of claim 3 further comprising a large-area beam measurement electrode having an area greater than a sum of areas of said segments.

5. The ionization chamber of claim 1 wherein said secondary beam cells are secondary beam passageways that extend partially through said housing.

6. The ionization chamber of claim 5 wherein said secondary beam passageways are symmetrically arranged about a periphery of said primary beam passageway.

7. The ionization chamber of claim 1 wherein said second beam measuring electrodes are along a plane perpendicular to said primary beam passageway and are coplanar with at least one electrode that is located within said primary beam passageway.

8. The ionization chamber of claim 1 wherein said primary beam passageway is pervious to surrounding atmosphere, said ionization chamber further comprising at least one temperature sensor in thermal contact with said housing for detecting a temperature of said housing.

9. The ionization chamber of claim 1 wherein said housing includes a plurality of annular members having inside diameters that define a periphery of said primary beam passageway, said first and second beam measuring electrodes being conductive members on films connected to said annular members.

10. The ionization chamber of claim 1 wherein said housing is positioned adjacent to a linear accelerator.

11. A clinical radiation system comprising:
    a linear accelerator for generating a radiation beam having a beam axis;
    a large-area beam measuring electrode on said beam axis, said large-area beam measuring electrode having an electrode axis;
    an array of second beam measuring electrodes arranged parallel to said large-area beam measuring electrode and symmetrically relative to said electrode axis, said array including at least three second beam measuring electrodes disposed immediately adjacent to said electrode axis, said array having a total area less than an area of said large-area beam measuring electrode; and
    high voltage electrodes disposed relative to said array and said large-area beam measuring electrode to induce ionization current in said large-area and second beam measuring electrodes in response to characteristics of said radiation beam.

12. The system of claim 11 further comprising a plurality of off-axis beam measuring electrodes and an ionization chamber housing having a beam passageway therethrough, said off-axis beam measuring electrodes being symmetrically arranged within said ionization chamber housing and spaced away from said beam passageway, said large-area and second beam measuring electrodes being located along said beam passageway and within said ionization chamber housing.

13. The system of claim 12 wherein said ionization chamber housing includes a plurality of coaxial annular members and wherein said large-area and off-axis and second beam measuring electrodes are formed of conductive material on an insulative film.

14. The system of claim 13 wherein said large-area and off-axis beam measuring electrodes are formed on a single insulative film.

15. The system of claim 12 further comprising at least one temperature sensor connected to said ionization chamber housing to monitor temperature, said ionization chamber housing being pervious to surrounding atmosphere.

16. An ionization chamber for monitoring a radiation beam comprising:
    an assembly of generally annular members coaxially arranged to define a housing having a central beam passageway, said assembly having a plurality of cells extending parallel to said central beam passageway;
    parallel insulative films connected to said annular members perpendicular to said central beam passageway;
    a large-area electrode formed on a first insulative film and positioned within said central beam passageway;
    an array of small-area electrodes formed on a second insulative film and positioned within said central beam passageway;
    a plurality of off-axis electrodes positioned within said cells; and
    voltage means for inducing ionization current at each of said large-area, small-area and off-axis electrodes in response to propagation of a radiation beam.

17. The ionization chamber of claim 16 wherein said off-axis electrodes are formed on said first insulative film and are symmetrically arranged about said large-area electrode.

18. The ionization chamber of claim 16 wherein said small-area electrodes are symmetrically arranged about an axis of said central beam passageway and are immediately adjacent said axis.

19. The ionization chamber of claim 16 wherein said voltage means includes a plurality of high voltage electrodes.

* * * * *